United States Patent [19]
Valenta, Jr. et al.

[11] 3,769,457
[45] Oct. 30, 1973

[54] STOP-IN-FRAME METHOD AND APPARATUS FOR FILM VIDEO PLAYER

[75] Inventors: Harry L. Valenta, Jr., North Chili; William A. Martin, Fairport; Lenard M. Metzger, Rochester, all of N.Y.

[73] Assignee: Eastman Kodak Company, Rochester, N.Y.

[22] Filed: Sept. 27, 2972

[21] Appl. No.: 292,568

[52] U.S. Cl. .......................... 178/7.2, 178/DIG. 28
[51] Int. Cl. .......................... H04n 5/36, H04n 5/30
[58] Field of Search ............ 178/5.2 D, 7.2, DIG. 28

[56] References Cited

UNITED STATES PATENTS 3,707,599 12/1972 Brown........................ 178/DIG. 28

*Primary Examiner*—Robert L. Richardson
*Attorney*—W. H. J. Kline et al.

[57] ABSTRACT

An electronic film video player for converting pictorial information in image frames on motion picture film into video signals for reproduction of the pictorial information as a video display. Film transport apparatus is operable in a play mode for continuously moving the motion picture film past a scanning gate in a forward direction. The image frames are scanned by a beam of light produced by a flying spot scanner of electrical to-optical signal transducer apparatus in a raster having a horizontal-to-vertical aspect ratio related to the aspect ratio of the image frames, and the continuous rate of movement of the motion picture film past the scanning gate. Optical-to-electrical signal transducer apparatus responds to the moving spot of light modulated in intensity by the pictorial information content of the scanned image frames for producing video signals representative thereof. The film transport apparatus is alternately operable in a rewind mode for continuously moving the motion picture film in a reverse direction to rewind the motion picture film. The film transport apparatus is also operable in a still mode for scanning a stationary image frame located in a predetermined position in the scanning gate. The stationary image frame is located in the predetermined position from either the play or rewind modes of operation of the film transport apparatus through the operation of a control circuit which halts forward or reverse film motion upon a still mode command signal, advances the motion picture film in the forward direction after a time delay sufficient to ensure that film motion has ceased, detects the entry of the image frame to be viewed into the predetermined position in the scanning gate, and halts forward film motion. The scanning beam is suppressed in response to the still command signal until the stationary image frame is located in the predetermined position for still frame scanning. The aspect ratio of the raster produced by the flying spot scanner is made to conform to the aspect ratio of the stationary image frame.

10 Claims, 2 Drawing Figures

STOP-IN-FRAME METHOD AND APPARATUS FOR FILM VIDEO PLAYER

CROSS REFERENCE TO RELATED APPLICATION

Reference is made to commonly assigned, copending U.S. application Ser. No. 60,493, entitled FILM SCANNING FOR TELEVISION REPRODUCTION, filed in the names of David L. Babcock and Lenard M Metzger on Aug. 3, 1970.

BACKGROUND OF THE INVENTION

Field of the Invention

In an electronic video player, such as that disclosed in the aforementioned copending U.S. application Ser. No. 60,493, motion picture film bearing pictorial information in image frames is continuously moved past a scanning gate in a forward direction with the player operated in a normal play mode for producing video signals to be reproduced as a video display in a television receiver. A flying spot scanner produces a moving spot of light in a scanning raster corresponding to a standard video field pattern to scan the moving image frames. Optical-to-electrical signal transducer apparatus responds to the moving spot or beam of light modulated in intensity by the pictorial information content of the scanned image frame to produce video electrical signals. These signals are then employed to form the television signal required to produce the video display in the television receiver. When the video player is operated in a rewind mode of operation, the motion picture film is continuously advanced in a reverse direction at a relatively high speed to rewind the motion picture film upon the film supply reel.

When the video player is operated in the forward or play mode of operation to produce the video signals corresponding to the information recorded on the film, the film continuously advances past the scanning gate at the rate at which the film was originally recorded. On Super 8 film, for example, image frames are recorded at either 18 or 24 frames per second in spaced apart relationship corresponding to perforations in the film. Since the vertical sweep frequency of the flying spot scanner is 60 Hz. in the United States, the normal 4:3 aspect ratio of the raster employed in the video camera to record live scenes or stationary image frames can no longer be used. In the aforementioned U.S. application Ser. No. 60,493, the film is advanced, for example, in the forward direction at 24 frames per second, whereas the raster pattern of the flying spot scanner is developed in a direction opposite to the forward direction of the moving film at 60 Hz. Consequently, the aspect ratio of the scanning raster must be compressed from its normal vertical dimension L to a vertical dimension equal to $[(60 - 24)/60] \times L$ or $3/5 \times L$. Furthermore, the successive image frames on the motion picture film must be alternately scanned two or three times as the frames pass through the scanning gate. These problems are overcome in the invention disclosed in the aforementioned U.S. application Ser. No. 60,493 through the addition of a compensating signal developed from double ramp scanning signal integrating circuits each responsive to the detection of alternate film frames advancing into a predetermined position in the scanning gate to the 60 Hz., sawtooth wave form, vertical deflection signal, both signals being applied to the vertical deflection plates of the flying spot scanner.

In electronic film video players of this type, it has been found desirable to include a still mode of operation of the film transport and scanning apparatus to produce a stationary visual display of a selected image frame of the motion picture film. This capability of video players is disclosed in U.S. Pat. No. 3,663,750, entitled AUTOMATIC BEAM BLANKING CIRCUIT FOR AN ELECTRONIC VIDEO PLAYER, issued May 16, 1972. In the apparatus disclosed in this patent, film motion in the forward or play mode of operation of the disclosed special film moving at 60 frames per second may be selectively halted by moving switch contacts from a play mode to a still mode which halts film motion and produces a standard 4:3 aspect ratio of the scanning raster produced by the flying spot scanner. The image frames on the film are stopped in an arbitrary position in the scanning gate with respect to the raster pattern produced by the flying spot scanner. As a consequence, a manually operated centering control is necessary to advance or retard the position of the desired image frame until it is capable of being scanned by the stationary raster pattern.

In systems of this type, wherein predetermined image segments of an image bearing medium having a discrete length, such as film, are continuously advanced during scanning, at a predetermined rate, the momentum and/or velocity of the medium may vary. Consequently, the cessation of the movement to scan individual stationary segments of the medium results in a disposition of the selected segment with respect to the scanner or transducer that is not uniform. In some manner, the segment must be accurately disposed with respect to the transducer.

SUMMARY OF THE INVENTION

It is an object of this invention to provide improved image transducer methods and apparatus for selectively transforming information in information segments of continuously moving or stationary information bearing medium into electrical signals.

It is an additional object of this invention to provide an improved still mode of operation in a film video player from a continuous play mode of operation.

It is yet another object of this invention to operate a film video player in a still mode of operation for producing a stationary video display of a selected image frame of motion picture film from either a continuous forward or rewind mode of operation of the video player.

It is a further object of this invention to provide a still mode of operation of a continuous motion film video player wherein a selected image frame may be automatically located for still frame video display in a predetermined position in a scanning gate of the video player.

It is also an object of this invention to provide a still mode of operation of a continuous motion film video player having a forward mode of operation for scanning motion picture film and a rewind mode of operation, wherein the forward and rewind modes of operation are selectively halted and a selected image frame is automatically located in a predetermined position in the scanning gate for producing a stationary video display of the image frame.

These and other objects of the invention are accomplished by a method and apparatus disclosed herein for converting information in information segments of an information bearing medium into electrical signals for reproduction of the information including methods and apparatus for changing from a first mode of operation wherein the medium may be continuously moved during production of electrical signals representative of the moving information segments and wherein the momentum imparted to the medium through its continuous movement is variable, to a second mode of operation wherein an information segment may be selectively located in a predetermined stationary position for production of electrical signals representative of the information content of the stationary information segment effected by: 1) initiating a first stopping operation of said continuously moving medium; 2) after advancement of the medium is halted and the variable momentum of the medium is dissipated, reinstituting movement thereof in a first direction; 3) after reinstitution of such movement, detecting an information segment of said medium moving into said predetermined position; and 4) instituting a second stopping operation of said medium following the detection of an information segment for halting the advancement of the detected information segment in said predetermined stationary position.

In accordance with a preferred embodiment of this invention, an electronic film video player for converting pictorial information in image frames on motion picture film into video signals for reproduction of the pictorial information in a video display includes a film transport apparatus operable in a forward or play mode for continuously moving the motion picture film past a scanning gate in a forward direction and operable in a rewind mode for continuously moving the motion picture film in a reverse direction to rewind the film upon a film supply reel. The video player further comprises detecting means for detecting each image frame moving in said forward direction into a predetermined position of a scanning gate, scanning means for producing a moving spot of light in a raster having a horizontal-to-vertical aspect ratio and a vertical position with respect to said scanning gate related to the aspect ratio of the image frames and the detection of each image frame, and for scanning the image frames of the film with said spot of light. Optical-to-electrical signal transducer means are included responsive to the moving spot of light modulated in intensity by the pictorial information content of the scanned image frames for producing video signals representative thereof.

The improvements of the video player comprise improvements in the film transport apparatus for operating the film transport apparatus in a still mode of operation for locating a selected image frame in stationary relationship in the predetermined position in the scanning gate and for scanning the stationary image frame by: 1) halting the operation of the film transport apparatus in the play or rewind modes of operation and producing a single frame advance signal after forward or reverse film motion is stopped and film momentum is dissipated; 2) operating the film transport apparatus in the forward direction in response to the single frame advance signal to move the motion picture film past the scanning gate in the forward direction; and 3) halting the operation of the film transport apparatus to stop a detected image frame in the predetermined position for still frame scanning conjointly in response to the advance signal and the detecting means. In this manner, the momentum of the film operated in the forward or rewind mode has no effect upon the location of the selected image frame in the scanning station, and it is not necessary to provide a manual centering control to center the stationary image frame with respect to the raster pattern produced by the flying spot scanner. Also, successive image frames of the motion picture film may be viewed in sequence by the repeated production of the single frame advance signal.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DETAILED DESCRIPTION OF THE PREFERRED EMBODIMENT

Figure 1:
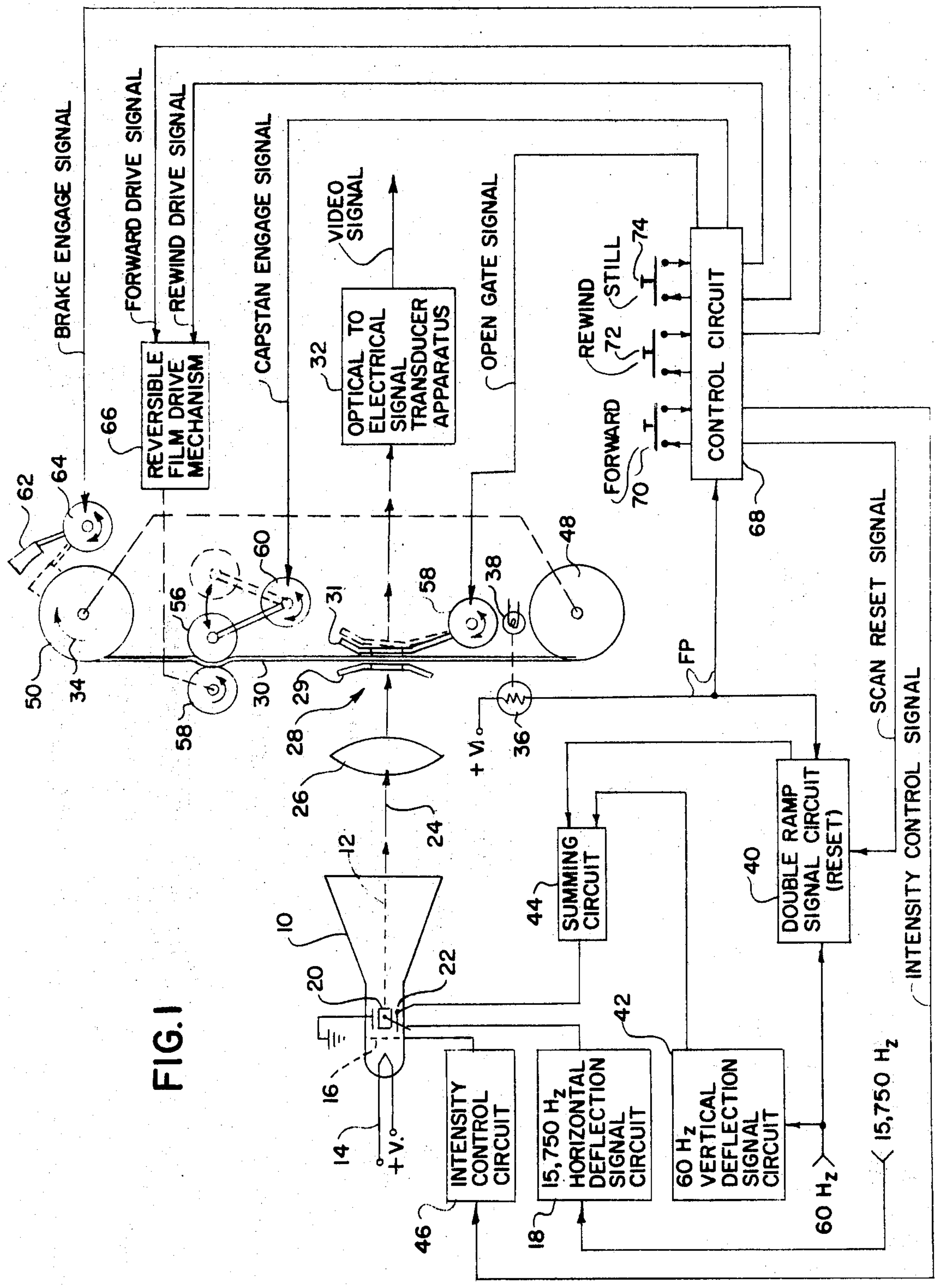
FIG. 1 is a combined mechanical and electrical circuit diagram, partially in block form, of a preferred embodiment of the invention.

Referring now to FIG. 1, there is shown in illustrative form portions of an electronic video player of the type disclosed in the aforementioned U.S. Pat. application Ser. No. 60,493 incorporating the improvements of this invention providing the still mode of operation of the video player. The video player, FIG. 1, comprises three main elements, an electrical-to-optical signal transducer apparatus for producing a scanning beam of light in the heretofore described video field raster pattern under the control of scanning beam deflection circuits, motion picture film in film transport apparatus operable in forward, rewind and still modes of operation under the control of a control circuit, and optical-to-electrical signal transducer apparatus for producing a video signal in response to the light passing through the scanned image frames of the motion picture film.

More particularly, the optical-to-electrical signal transducer apparatus comprises the flying spot scanner cathode ray tube 10 producing an electron beam 12 from a cathode 14, the intensity of which is controlled by a grid potential applied to the grid 16. The flying spot scanner 10 is of a conventional type and operates to produce a raster on the phosphor screen thereof at the vertical and horizontal line frequencies used in conventional television receivers. To this end, a 15,750 Hz. horizontal deflection signal is developed by circuit 18 in response to a 15,750 Hz. signal and is applied to the horizontal deflection plates 20 of the flying spot scanner 10. The vertical deflection of the scanning beam 12 is accomplished by a vertical deflection signal developed in a manner to be described in greater detail hereinafter and applied to the vertical deflection plates 22 of the flying spot scanner 10.

The electron beam 12 striking the phosphor screen of the flying spot scanner 10 produces a scanning spot or beam of light 24. The raster pattern is imaged by a lens or lenses 26 (of any suitable type) through a film scanning aperture or gate 28, comprising stationary film guide 29 and movable film guide 31, and upon an image frame (not shown) of motion picture film 30.

The pictorial information in the image frames modulates the intensity and color of the beam of light 24 as it passes therethrough and is detected by optical-to-electrical signal transducer apparatus 32. The apparatus 32, shown in greater detail in the aforementioned U.S. application Ser. No. 60,493, responds to the intensity modulated beam of light to produce video signals suitable for controlling the video display of the image frames on the motion picture film 30.

The motion picture film 30 is advanced, during the normal forward or play mode of operation of the film transport apparatus to be described hereinafter in the forward direction denoted by arrow 34 in parallel with, but opposite to, the vertical deflection of the scanning beam 12, at a film frame rate of, for example, 24 frames per second. The standard (in the United States) vertical deflection frequency is 60 Hz., and, as described in U.S. application Ser. No. 60,493, it is necessary to provide a compensating signal for the instantaneous position and velocity of the moving image frames relative to the scanning gate 28 and to apply the combined vertical deflection signal and compensating signal to the vertical deflection plates 22 of the flying spot scanner 10. To this end, the film frame rate is detected by a photoconductive device 36 responding to light from lamp 38 passing through or modulated by indicia (not shown) associated with each image frame of the motion picture film 30. Each pulse of the frame rate frequency signal FP is produced as a film frame associated with the detected perforation enters a predetermined, reference, position in the scanning gate. Thus, the frame rate frequency signal FP is employed to provide both position and velocity information. The frame rate frequency signal FP and the 60 Hz. line frequency signal are applied to a double ramp signal circuit 40 to produce the compensating signal in the manner disclosed in U.S. application Ser. No. 60,493. The 60 Hz. signal is also applied to a 60 Hz. vertical deflection signal circuit 42 to provide a sawtooth wave form vertical deflection signal which is sufficient to produce a raster having a 4:3 aspect ratio and a vertical dimension equal to the vertical dimension of each image frame on the motion picture film 30. The standard sawtooth wave form 60 Hz. vertical deflection signal and the compensating signal are combined in summing circuit 44 which modifies the vertical dimension of the resultant raster in accordance with the relationship of the frequency of the film frame rate signal FP to the 60 Hz. signal. The double ramp signal circuit 40 comprises a pair of resettable, sawtooth wave form generating integrating circuits 61 and 62 (not shown) that produce the double ramp signals in the manner described in U.S. application Ser. No. 60,493. The "reset" input terminal of FIG. 1 is connected to the integrating circuits 61 and 62 to reset the amplitude of the double ramp signals to zero in response to a SCAN RESET SIGNAL in a manner to be described hereinafter. Normally, the double ramp signals are reset to a reference level or zero voltage level corresponding to the voltage level of the vertical deflection signal sufficient to deflect the scanning beam to an edge of the predetermined position in the scanning gate by alternate pulses of the signal FP.

An intensity control circuit 46 is coupled to the intensity control grid 16 of the flying spot scanner 10 to control the intensity of the scanning spot of light 24 as a function of a received INTENSITY CONTROL SIGNAL.

The remaining elements of the video player of FIG. 1 comprise the mechanical film transport apparatus and the control circuit for operating the video player in the play mode, the rewind mode or the still mode. The mechanical film transport apparatus comprises the film supply and take-up reels 48 and 50, respectively, the film scanning gate 28, movable capstan 56 engaging one surface of the film 30, film drive roller 58 engaging the opposite surface of the film 30 and brake 62. Preferably, the film supply reel 48 comprises a film cartridge removable from the video player, and the film take-up reel 50 is incorporated in the video player. The movable film guide 31 of the scanning gate 28 is movable between the positions shown in solid and broken lines in FIG. 1 by a scanning gate solenoid 58. In the same manner, the position of the capstan 56 is controlled by a capstan solenoid 60. A brake 62 and brake solenoid 64 are associated with the take-up reel 50. Preferably, the supply reel 48 in the cartridge placed in the video player and the take-up reel 50 share a common drive axle driven by a reversible film drive 66, so that the application of the brake 62 to the take-up reel 50 immediately halts motion of both the supply and take-up reel. As shown in FIG. 1, the reversible film drive mechanism 66 is mechanically coupled to the supply reel 48, the film drive roller 58 and the film take-up reel 50.

The gate solenoid 58, the capstan solenoid 60, the brake solenoid 64 and the reversible film drive mechanism 66 are all selectively controlled by respectively denominated electrical signals produced by the control circuit 68. Coupled to the control circuit 68 are a forward command signal generating switch 70, a rewind command signal generating switch 72 and a still command signal generating switch 74. The switches 70, 72 and 74 may be of the momentary contact, push button type labeled FORWARD, REWIND and STILL respectively. The control circuit 68 also receives the frame rate signal FP applied at an input terminal thereof.

Turning now to the operation of the video player shown in FIG. 1, it will be assumed that a film cartridge containing the supply reel 48 is placed in the video player and the film 30 is automatically threaded upon the take-up reel 50. If it is desired to provide a continuous video display of the motion picture film 30, the FORWARD button switch 70 is depressed to produce the FORWARD COMMAND SIGNAL. The control circuit 68 responds by generating a CAPSTAN ENGAGE SIGNAL, a FORWARD DRIVE SIGNAL and the INTENSITY CONTROL SIGNAL. The CAPSTAN ENGAGE SIGNAL is applied to the capstan solenoid 60 to move the capstan 56 into the depicted solid line position to press the motion picture film 30 against the film drive roller 58. The FORWARD DRIVE SIGNAL is applied to the reversible film drive mechanism which drives the supply reel 48, the take-up reel 50 and the film drive roller 58 to continuously advance the motion picture film 30 in the forward direction at a film frame rate selected by the operator through a switch not shown here. The INTENSITY CONTROL SIGNAL is applied to the intensity control circuit 46 to produce a grid voltage on grid 16 sufficient to insure that a scanning beam of light 24 is produced by the flying spot scanner 10.

As the motion picture film 30 advances from the supply to the take-up reel, the momentum of the film in the scanning gate may vary. Any variations in the velocity of the film 30 are detected by the double ramp signal circuit 40 which adjusts the vertical deflection of the scanning beam 12 to compensate therefore in the manner described in the aforementioned U.S. application Ser. No. 60,493.

Due to the momentum of the motion picture film 30, switching directly from the forward mode of operation to the rewind mode of operation (or vice versa) is unacceptable due to the strain placed upon the motion picture film 30. However, means may be provided for automatically slowing the film and switching from the forward mode to the rewind mode when the trailing end of the motion picture film 30 leaves the supply reel 48. At any other time, it is necessary, in accordance with our invention, to go from the rewind or forward modes of operation into the still mode of operation which halts film motion in either direction. Thereafter the desired mode of operation may be selected.

When the rewind mode of operation is initiated by depressing the REWIND button switch 72, an OPEN GATE SIGNAL is produced which, when applied to the gate solenoid 58, withdraws the movable film guide 31 from engagement with the film 30, and a REWIND drive signal is generated and applied to the reversible film drive mechanism 66 to drive the supply and take-up reels 48 and 50 in the direction opposite to the direction of arrow 34. The INTENSITY CONTROL SIGNAL is no longer produced and, consequently, the intensity control circuit 46 responds by changing the grid voltage on grid 16 to inhibit the production of the scanning electron beam 12, thus extinguishing the scanning beam of light 24. During rewind, the film 30 is rewound on the supply reel 48 at a relatively high continuous frame rate and, of course, the CAPSTAN ENGAGE, the BRAKE ENGAGE and the FORWARD DRIVE SIGNALS are not produced to insure that the capstan 56 is withdrawn from contact with the film 30 and the brake 62 is withdrawn from contact from the take-up reel 50. It may be desirable, to include in the control circuit 68 a further switch to provide the INTENSITY CONTROL SIGNAL and a lower rate of movement of the film 30, so that reverse visual display of the image frames of the motion picture film 30 may be produced, if desired.

During the rewind mode of operation of the film 30, the momentum of the film through the scanning gate 28 also varies as the film builds up on the supply reel 48. Consequently, if it is desired to make the transition from either the forward or rewind modes of operation into the still frame scanning mode, this variation in the momentum of the film must be accounted for. Otherwise, the simple cessation of movement of the film would result in an arbitrary location of the selected still frame in the scanning gate, and it would be necessary to provide a manual film positioning control to locate the selected still frame in the required scanning relationship with respect to the flying spot scanner 10. Also, it is desirable to provide an intermittent, frame-by-frame advance of the image frames wherein it is necessary to locate each frame in the same position.

To prevent the irregularity in positioning of the selected still frame in the scanning gate 28, the control circuit 68 provides a still mode of operation in response to a STILL MODE COMMAND SIGNAL produced by depression of the STILL button switch 74. In this still mode of operation, film motion in either the forward or reverse direction is terminated by terminating the FORWARD or REVERSE DRIVE SIGNAL, respectively, and application of the brake 62. The STILL MODE COMMAND SIGNAL also terminates the INTENSITY CONTROL SIGNAL to extinguish the scanning spot of light 24 and simultaneously produces a SINGLE FRAME ADVANCE SIGNAL (not shown in FIG. 1) which is applied as the FORWARD DRIVE SIGNAL to the reversible film drive mechanism to initiate the advancement of the film 30 in the forward direction.

The advancement of the film 30 in the forward direction is terminated upon the production of the first pulse following film advancement of the frame rate signal FP produced by photosensor 36. The first pulse of the frame rate signal FP also produces in the control circuit 68 the INTENSITY CONTROL SIGNAL, a SCAN RESET SIGNAL for resetting the double ramp integrators of the double ramp signal circuit 40 and a BRAKE ENGAGE SIGNAL for driving the brake 62 into engagement with the take-up reel 50 to halt further film advancement. In this manner, a single frame of the film 30 may be selected for still frame scanning while the film is advanced in either the forward or reverse direction, and the problems caused by the variable momentum of the continuously advanced film 30 are eliminated. The selected image frame is located in a predetermined position in the scanning gate 28 immediately following the detection of the perforation or indicia associated with the selected film frame. During the calibration period following the manufacture of the video player, the small amount of film travel following the detection of the indicia is compensated for by adjusting the location of the photosensor 36 and lamp 38.

Thus the control circuit 68 provides a number of signals that interreact with the film transport apparatus and the electrical-to-optical film scanner to provide a number of modes of operation of the video player. The logic circuit producing the various signals in response to the frame rate signal FP and the various operator initiated command signals will now be described with reference to FIG. 2.

Figure 2:
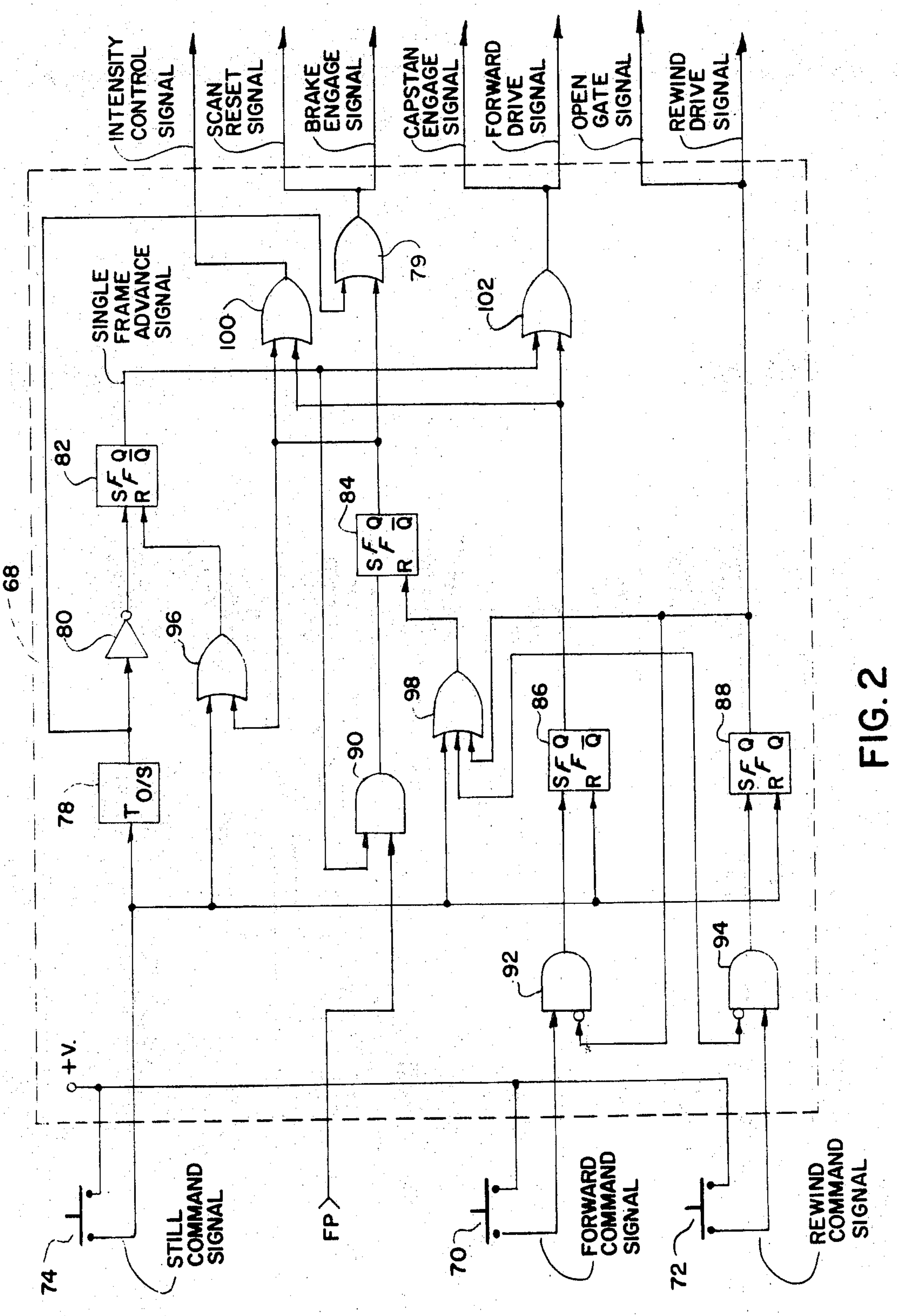
FIG. 2 is a logic circuit diagram of a control circuit used in FIG. 1 for providing the different modes of operation of the video player.

In FIG. 2, the control circuit 68 is enclosed within the broken lines. The FORWARD, REWIND, and STILL button switches 70, 72 and 74, respectively, produce, upon momentary closure, a positive going FORWARD COMMAND SIGNAL, REWIND COMMAND SIGNAL and STILL COMMAND SIGNAL, respectively. The various output signals described with respect to FIG. 1 are also shown as the output terminals of the control circuit 68 of FIG. 2. The control circuit 68 comprises interconnected logic elements including one-shot circuit 78 having a predetermined time period, inverting differentiator 80, RS flip flops 82, 84, 86 and 88, AND gates 90, 92 and 94 and OR gates 96, 98, 100 and 102. The states of the one-shot circuit 78 and the RS flip flop circuits are switched upon the positive going transitions of signals applied at their respective input terminals. Unless otherwise noted, the AND and OR gates respond to high logic level input signals applied to their respective input terminals.

Turning now to the still mode of operation of the control circuit 68, it will first be assumed that the video player is initially operating in the forward or play mode. In this condition, the Q output terminal of the flip flop 86 is at the high logic level providing a positive signal which is applied in parallel to one input terminal of OR gates 100 and 102 to form the INTENSITY CONTROL SIGNAL, the CAPSTAN ENGAGE SIGNAL and the FORWARD DRIVE SIGNAL to drive the film 30 in the forward direction. The positive signal level of the Q output terminal of flip flop 86 is also applied through one input terminal of OR gate 98 to the R input terminal of flip flop terminal 84 to reset flip flop 84 and is applied to an inverting input terminal of AND gate 94 to inhibit the passage of a REWIND COMMAND SIGNAL through AND gate 94 to the S input terminal of flip flop 88.

Upon the depression of the STILL button switch 74, the STILL COMMAND SIGNAL is applied to the trigger T input terminal of one-shot circuit 78 and, in parallel, to an input terminal of OR gates 96 and 98 and to the R input terminals of flip flops 86 and 88. The STILL COMMAND SIGNAL resets flip flop 86 to terminate the high logic level at the Q output terminal of flip flop 86 and to consequently terminate the INTENSITY CONTROL SIGNAL, the CAPSTAN ENGAGE SIGNAL and the FORWARD DRIVE SIGNAL. The STILL COMMAND SIGNAL applied to the R input terminals of flip flops 84 and 88 has no effect, since these flip flops are already reset. As described hereinbefore, the termination of the INTENSITY CONTROL SIGNAL extinguishes the scanning spot of light 24. The termination of the CAPSTAN ENGAGE SIGNAL and the FORWARD DRIVE SIGNAL in co-operation with a BRAKE ENGAGE SIGNAL terminates forward advancement of the film 30.

The one-shot 78 responds to the STILL COMMAND SIGNAL by producing a positive going signal of a fixed time duration selected to be longer than the time period necessary to insure that film motion in either the forward or reverse direction has ceased. The fixed duration signal produced by the one-shot 78 is applied to the input terminal of a signal inverting differentiator 80 and is also employed as a BRAKE ENGAGE SIGNAL through OR gate 79. Upon the termination of the fixed duration signal produced by the one-shot 78, the inverting differentiator 80 produces a positive going spike signal which is applied to the S input terminal of flip flop 82. Flip flop 82 is set by the positive spike signal (corresponding to a time delayed STILL COMMAND SIGNAL) to produce a positive SINGLE FRAME ADVANCE SIGNAL at its Q output terminal. The SINGLE FRAME ADVANCE SIGNAL is applied to a further input terminal of OR gate 102 to produce the CAPSTAN ENGAGE SIGNAL and the FORWARD DRIVE SIGNAL to initiate forward film drive. At the same time, the SINGLE FRAME ADVANCE SIGNAL is applied to one input terminal of AND gate 90, to preset AND gate 90 to receive the first pulse of the frame rate frequency signal FP.

Thus, so far in the explanation of the control circuit 68, the STILL COMMAND SIGNAL has halted film advance in the forward mode of operation, and after a time delay sufficient to insure that film motion has ceased and the accompanying film momentum has dissipated, a SINGLE FRAME ADVANCE SIGNAL has initiated forward film advancement. The forward film drive is terminated, in accordance with this invention, at the time that the selected still frame begins to enter a predetermined still frame scanning position in the scanning gate 28. This termination of the film advancement is accomplished by the response of flip flop 84 to the first pulse of the frame rate signal FP applied to the S input terminal of the flip flop 84 through the preset AND gate 90. Accordingly, the flip flop 84 is set by the first pulse of the frame rate signal FP, and a positive logic signal is produced at the Q output terminal thereof which is employed as the SCAN RESET SIGNAL and passes through OR gate 79 to be employed as a BRAKE ENGAGE SIGNAL and is also applied through one input terminal of OR gate 96 to the R input terminal of flip flop terminal 82 to reset flip flop 82 and terminate the SINGLE FRAME ADVANCE SIGNAL. To insure that the forward film advancement is terminated immediately following the detection of a film frame advanced into the predetermined position in the scanning gate 28, the brake 62 engages the film take-up reel 50 in response to the BRAKE ENGAGE SIGNAL to halt its rotation, and at the same time the capstan 56 is withdrawn by the capstan solenoid 60 in response to the termination of the CAPSTAN ENGAGE SIGNAL and forward film drive ceases in response to the termination of the FORWARD DRIVE SIGNAL. The amount of film advance in response to the SINGLE FRAME ADVANCE SIGNAL does not exceed the dimension L of one film frame. Accordingly, the momentum built up in the film transport apparatus is very small and relatively uniform, and the film halts in the predetermined position in a very short time following its detection. Thus, the final step of terminating the film advancement in response to the advancement of the selected frame into the predetermined position of the scanning gate 28 necessary for still frame scanning is accomplished. The SCAN RESET SIGNAL produced by the flip flop 84 resets the double ramp integrators shown more particularly in the aforementioned U.S. application Ser. No. 60,493, to reduce the compensating signal to a predetermined, DC level or zero. Thereafter, the horizontal-to-vertical aspect ratio of the raster pattern of the scanning beam 24 is controlled by the standard 60 Hz. vertical deflection signal, whereby the full image area of the stationary film frame may be automatically scanned.

Occasionally, it may be desirable to still frame scan successive image frames of the motion picture film 30. To this end, it is only necessary to repeatedly depress the STILL button switch 74 to produce further STILL COMMAND SIGNALS. In the manner hereinbefore described, each STILL COMMAND SIGNAL resets flip flop 84 to terminate the INTENSITY CONTROL SIGNAL, the SCAN RESET SIGNAL, and the BRAKE ENGAGE SIGNAL, to initiate the SINGLE FRAME ADVANCE SIGNAL, and to terminate the single frame advance upon the advance of the next succeeding image frame into the predetermined position of the scanning gate 28. In this manner, each image frame of the motion picture film 30 may be intermittently advanced and viewed as a stationary video display.

To return to the forward or play mode of operation, it is necessary to depress the FORWARD button switch 70 to produce a FORWARD COMMAND SIGNAL. In the absence of a set condition of flip flop 88, AND gate 92 passes the FORWARD COMMAND SIGNAL to the S input terminal of flip flop 86. Flip flop 86 is set by the positive going transition of the FORWARD COMMAND SIGNAL and produces a high logic level at its Q output terminal. The high logic level at the Q output terminal is applied through OR gate 98 to the R input terminal of flip flop 84 to reset flip flop 84 and to thereby terminate the SCAN RESET SIGNAL and the BRAKE ENGAGE SIGNAL. The brake 62 is thereby disengaged, and the INTENSITY CONTROL SIGNAL, the CAPSTAN ENGAGE SIGNAL and the FORWARD DRIVE SIGNAL are produced in response to the high logic level of the Q output of flip flop 86.

In a similar manner as described above, it is possible to go from the still mode of operation into the rewind mode of operation and vice versa. In the former instance, the depression of the REWIND button switch 72 produces a positive going REWIND COMMAND SIGNAL that is passed by AND gate 94 (since flip flop 86 is reset) to the S input terminal of flip flop 88. Flip flop 88 is set by the positive going transition of the REWIND COMMAND SIGNAL and produces the OPEN GATE SIGNAL and REWIND DRIVE SIGNAL at its Q output terminal. The high logic level of the Q output terminal is also applied through OR gate 98 to reset flip flop 84 to terminate the INTENSITY CONTROL SIGNAL, the SCAN RESET SIGNAL and the BRAKE ENGAGE SIGNAL. The OPEN GATE SIGNAL is applied to the gate solenoid 58 to disengage the movable film guide 31 from contact with the film 30. The capstan 56 is disengaged by the termination of the CAPSTAN ENGAGE SIGNAL, and the scanning beam 24 is terminated by the termination of the INTENSITY CONTROL SIGNAL. Rewind is accomplished in the reverse direction at a high rate of speed.

The Q output terminals of the flip flops 86 and 88 are connected to inverting input terminals of AND gates 92 and 94 to prevent the operator of the video player from switching directly between the forward and rewind modes of operation. It is first necessary to go into the still mode of operation to produce the STILL COMMAND SIGNAL which resets the previously set flip flop 86 and 88. Thereafter, it is possible to go directly into the forward or rewind mode of operation.

As noted hereinbefore, other modes of operation are possible. A reverse display mode of operation may be incorporated in the control circuit 68 to enable the operator to view the film 30 running backwards to select a portion of the film for normal forward viewing. Also, a standby mode of operation may be incorporated in the control circuit 68 wherein power is applied to the various components of the video player but the electrical-to-optical signal transducer apparatus and the film transport apparatus are deactivated. The standby mode may also be gone into directly following the automatic rewinding of the motion picture film 30 at the end of the film, so that a further film cartridge may be placed upon the video player. Other modes of operation of video players of this type may be incorporated in the control circuit 68.

The invention has been described in detail with particular reference to preferred embodiments thereof, but it will be understood that variations and modifications can be effected within the spirit and scope of the invention.

We claim:

1. In a method of converting information in information segments of an information bearing medium into electrical signals for reproduction of the information, an improved method of changing from a first mode of operation wherein the medium may be continuously moved during production of the electrical signals representative of the moving information segments and wherein the momentum imparted to the medium through its continuous movement is variable, into a second mode of operation wherein an information segment may be selectively located in a predetermined stationary position for production of electrical signals representative of the information content of the stationary information segment, said method comprising the steps of:

a. initiating a first stopping operation of said continuously moving medium;
b. when the medium is stopped and the variable momentum of the medium is dissipated, reinstituting the movement of said medium in a first direction;
c. after reinstitution of such movement, detecting an information segment of said medium moving into said predetermined position; and
d. instituting a second stopping operation of said medium following the detection of the information segment for halting the movement of the detected information segment in said predetermined stationary position.

2. The method of claim 1 wherein said medium is continuously moved in the first or second direction opposite to said first direction in said first mode of operation.

3. In transducer apparatus for converting information in information segments of an information bearing medium into electrical signals for reproduction of the information including transporting means operable in a first mode for continuously moving said medium past a transducer to produce the electrical signals, wherein the momentum imparted to the medium through its movement by the transport means is variable; the improvement comprising means for operating said transport means in a second mode of operation for selectively locating an information segment in a predetermined stationary relationship with said transducer to enable the production of electrical signals representative of the information content of the stationary information segment, said improvement comprising:

a. means for halting the continuous movement of said medium;
b. means for producing an advance signal after continuous movement of the medium is halted and the variable momentum of the medium is dissipated;
c. means responsive to the advance signal for resuming movement of said medium in a first direction;
d. means for detecting an information segment of said medium moving into said predetermined stationary relationship with said transducer; and
e. means conjointly responsive to the advance signal and the operation of said detecting means for halting the movement of the detected information segment in said predetermined stationary relationship with said transducer.

4. The apparatus of claim 3 wherein said transporting means is operable in said first mode for continuously moving said medium past said transducer in a first or a second direction opposite to said first direction.

5. The improvement in the apparatus of claim 3 wherein said means for halting the movement of the detected information segment responds to the detection of the information segment during the production of the advance signal to terminate the advance signal and further comprises brake means for braking movement of said medium at said predetermined stationary relationship with said transducer.

6. In an electronic video player for converting pictorial information in image frames on motion picture film into video signals for reproduction of the pictorial information as a video display including film transport apparatus operable in a play mode for continuously moving said motion picture film past a scanning gate in a forward direction and operable in a rewind mode for continuously moving said motion picture film past said scanning gate in a reverse direction, detecting means for detecting each image frame of said film moving in said forward direction into a predetermined position of said scanning gate, scanning means for producing a moving spot of light in a raster having a horizontal-to-vertical aspect ratio and vertical position with respect to said scanning gate related to the aspect ratio of the image frames, and modified by the detection of each image frame, and for scanning the image frames of the film moving past said scanning gate with said spot of light, and optical-to-electrical signal transducer means responsive to the moving spot of light modulated in intensity by the pictorial information content of the scanned image frames for producing video signals representative thereof, wherein the momentum imparted to the film during its continuous movement past said scanning gate in said forward and reverse directions is variable; the improvement comprising apparatus for operating said film transport apparatus and said scanning means in a still mode of operation for selectively locating a stationary image frame in said predetermined position in said scanning gate for scanning the stationary image frame, said improvement comprising in combination:

a. means selectively operable for halting the continuous movement of said film past said scanning gate by said film transport apparatus and for producing a single frame advance signal after the variable momentum of the film is dissipated and film advancement is halted;
b. means responsive to the single frame advance signal for operating said film transport apparatus in said play mode to move said film past said scanning gate in said forward direction; and
c. means conjointly responsive to the single frame advance signal and the operation of said detecting means for halting the play mode of operation of said film transport apparatus to stop a detected image frame in said predetermined position for still frame scanning, whereby a stationary video display of the pictorial information in the stationary image frame may be produced.

7. The improvement in the video player of claim 6 further comprising means for extinguishing said scanning spot of light in response to said selectively operable means and for restoring the scanning spot of light in response to the operation of the detected image frame halting means.

8. The improvement in the video player of claim 6 further comprising means responsive to the operation of the detected image frame halting means for controlling the horizontal-to-vertical aspect ratio of said raster in direct relation to the aspect ratio of the detected image frame in said predetermined position during still frame scanning thereof.

9. The electronic video player of claim 6 further comprising means selectively operable to produce a forward drive signal for operating said film transport apparatus in said play mode and a reverse drive signal for operating said film transport apparatus in said rewind mode, and wherein the improvement in said video player further comprises:

a. in said selectively operable means, means for producing a still command signal and means responsive to the still command signal for terminating the forward and reverse drive signals and for producing the single frame advance signal after a predetermined time period; and
b. said detected image frame halting means further comprises means responsive to the detection of an image frame by said detecting means during the production of the single frame advance signal for terminating the single frame advance signal and for braking the movement of said film at said predetermined position of said scanning gate.

10. The improvement in the video player of claim 9 further comprising:

a. means for extinguishing said scanning spot of light in response to the operation of said selectively operable means and for restoring the scanning spot of light in response to the operation of said detected image frame halting means; and
b. means responsive to the operation of said image frame halting means for controlling the horizontal-to-vertical aspect ratio of said raster in direct relation to the aspect ratio of the detected image frame in said predetermined position during still frame scanning thereof.

* * * * *